No. 722,165. PATENTED MAR. 3, 1903.
G. STREICH.
DUMP CART OR WAGON.
APPLICATION FILED OCT. 9, 1902.
NO MODEL.
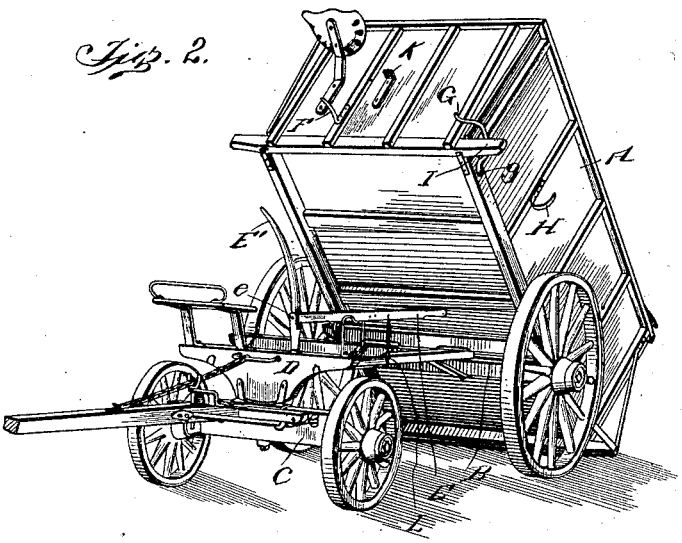
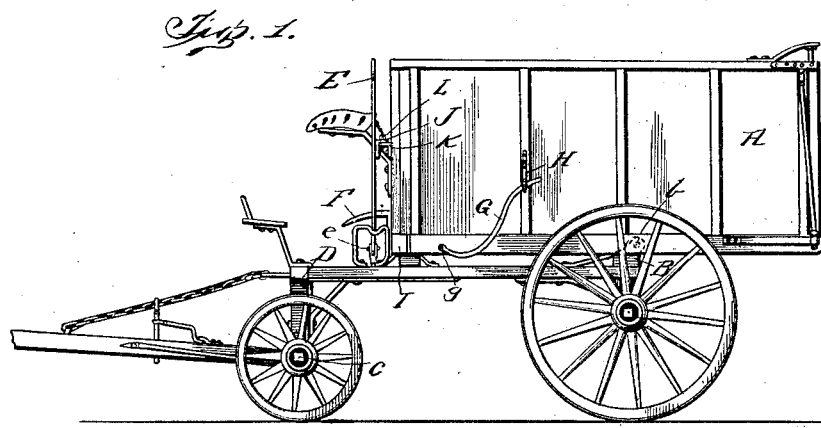
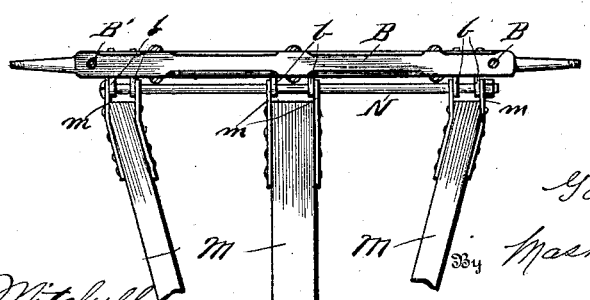

UNITED STATES PATENT OFFICE.

GABREIL STREICH, OF OSHKOSH, WISCONSIN.

DUMP CART OR WAGON.

SPECIFICATION forming part of Letters Patent No. 722,165, dated March 3, 1903.

Application filed October 9, 1902. Serial No. 126,617. (No model.)

*To all whom it may concern:*

Be it known that I, GABREIL STREICH, a citizen of the United States, residing at Oshkosh, in the county of Winnebago and State of Wisconsin, have invented new and useful Improvements in Dump Carts or Wagons, of which the following is a specification.

My invention relates to an improvement in dump-wagons.

The objects of my invention are to facilitate and to render easy the dumping of the wagon and the return to its normal position.

In the accompanying drawings, Figure 1 is a side elevation of my invention before the wagon is dumped, and Fig. 2 is a perspective view after the wagon has been dumped. Fig. 3 is a detail view.

Similar letters refer to similar parts in each view.

My invention is preferably adapted to four-wheeled vehicles.

In the drawings, A represents the body of the wagon, and B represents the axle to which the body is hinged.

C represents the forward axle and gear which supports the platform D, upon which the box rests in its normal position.

E is a bell-crank lever pivoted at $e$ to a brace extending upwardly from the front beam of the wagon. The short arm of the lever E' is curved downwardly.

F is a spur attached to the body of the wagon and curved downwardly over the short arm of the lever E' when the box is at its normal position.

In operating the wagon the operator pulls downwardly upon the bell-crank lever E, and the opposite arm E' engages the spur F and raises the front end of the box to the position shown in Fig. 2, dumping the wagon. G is a revoluble handle pivoted at $g$ to the beam of the box and resting normally in the hook H. After the wagon is dumped and the operator desires to restore the box to its normal position he revolves the handle G until it engages the extending cross-beam of the body I at the position shown in Fig. 2 and pulls downwardly upon the lever until the center of gravity is overcome, when the box will drop by gravitation, the spur F will strike against the arm E', forcing it downward, and the handle E in ascending upwardly will strike against the handle G, throwing it over into the hook H. The bell-crank lever E and the handle G will thereby be restored to their normal positions. J is an offset provided either integral with or attached to the lever-handle E, by which the lever may be locked to a bracket K, extending from the front of the box, by means of a locking-pin L, passing through eyes in both, so as to lock them together and retain the box in its normal position.

My invention is adapted to either dump-carts or dump-wagons which may be provided with iron boxes, steel boxes, or wooden boxes.

In the accompanying drawings, Fig. 3 represents a plan view of a feature of my invention where steel or iron boxes are used, the object being to dump the box short. B represents the rear axle, and $b\ b\ b$, &c., represent crank-arms extending forward from the axles and attached rigidly thereto in any desired manner, as is shown in dotted lines $b$, Fig. 1, and also in the plan view, Fig. 3. $m\ m\ m$, &c., represent ears attached to each brace-plate M M M, &c., forming the frame of the wagon, one upon each side of each brace, so as to correspond with the respective lugs of corresponding ears. Eyes are provided through the lugs and ears, so that one rod N may be passed laterally through all of them and secured by a head upon one end and a nut upon the other. The steel or iron box is rigidly attached to the axle B, preferably by bolts passing through the openings B' B' and braces extending from the floor of the box around beneath the axles.

It will be observed that by the construction and mechanism shown in Fig. 3 the dumping of the box carries with it the rear axle B, which rocks upon the rod N. This feature insures a short dump, and provides a strong and durable rocking hinge, that will withstand the dumping of a very heavy load. The jar of dumping does not come upon the axle, and the hinge is flexible in its vertical motion, so as to avoid strain or breakage.

Having thus fully described my invention, what I claim as new, and desire to secure by Letters Patent, is—

1. In a dump-wagon, the combination with a body and running-gear, of an elbow-lever having a curved arm pivotally secured to a standard, said standard secured to the running-gear, a rest secured to the running-gear and adapted to receive said lever, locking-plates carried by the body and said lever, of a spur secured to the body and a curved handle journaled upon said body, said lever adapted to engage the curved handle and swing it upon its pivot when the body is swung into one direction, substantially as described.

2. In a device of the character described, the combination with a wagon-body pivotally secured to suitable running-gear, of a handle journaled upon the body, and a lever pivotally secured to the running-gear, means on said body for engaging said lever whereby said body may be swung on its pivot, said lever being adapted to engage and swing said handle when the body is swung in one direction, substantially as described.

3. In a dumping-wagon, the combination with a body and running-gear of an elbow-lever comprising a handle and curved arm pivotally mounted upon the running-gear, means secured upon the body for engaging the concave surfaces of the curved arm of said lever, and means engaged and operated by the body in approaching its normal position for locking said body in said position, substantially as described.

4. In a dumping-wagon, the combination with a body and running-gear of a dumping-lever comprising a handle and a curved arm journaled upon a standard, said standard secured to the running-gear, a spur upon the body for engaging the concave surfaces of the curved arm of said lever, an offset carried by said lever coöperating with a bracket secured to the body and means for positively locking said offset and bracket in one position, substantially as described.

In testimony whereof I have hereunto set my hand in the presence of two subscribing witnesses.

GABREIL STREICH.

Witnesses:
HERBERT FRITZEL,
ANNA R. WATERHOUSE.